United States Patent Office 3,366,202
Patented Jan. 30, 1968

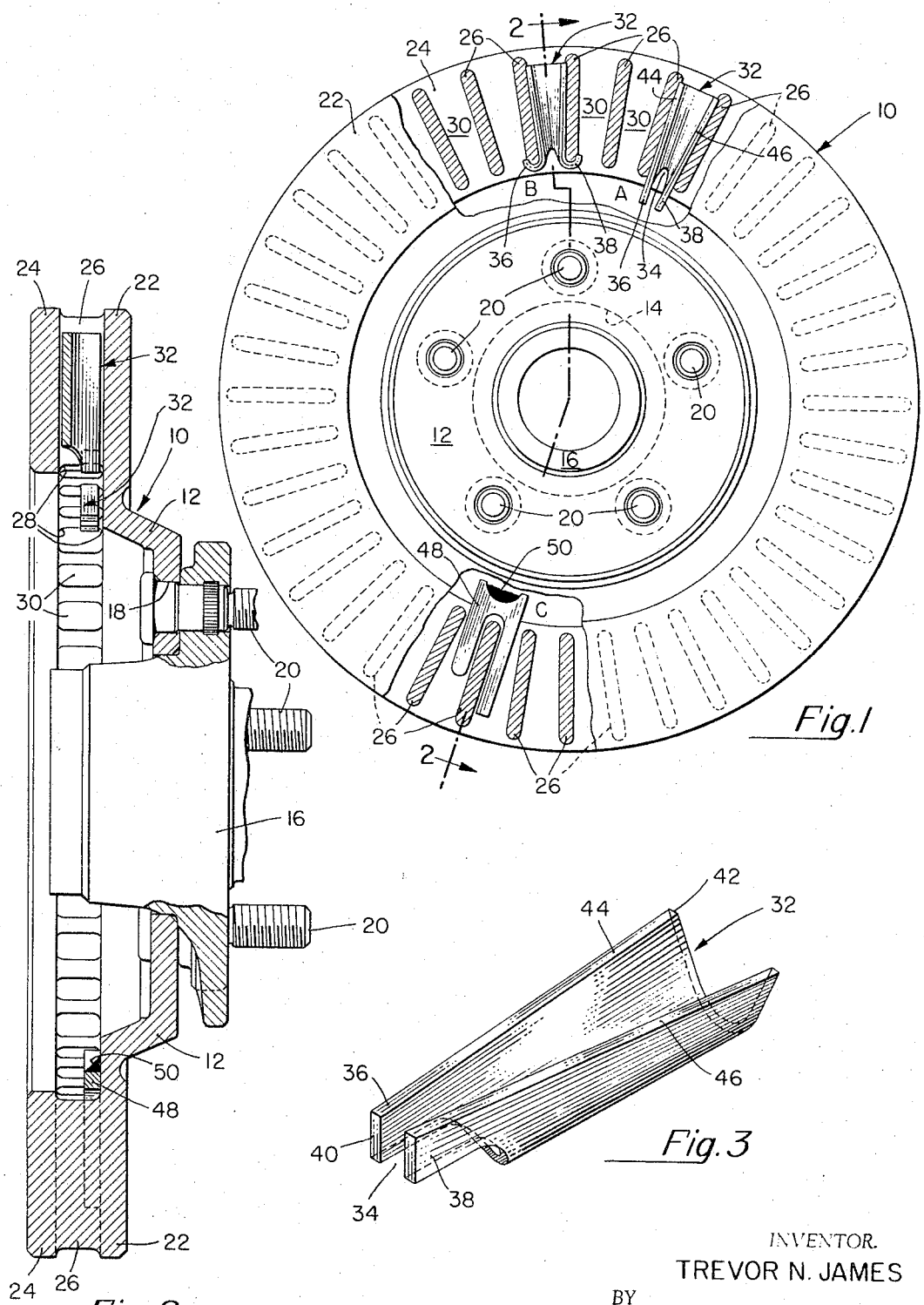

3,366,202
BRAKE DISK AND BALANCE WEIGHT
COMBINATION
Trevor N. James, St. Clair Shores, Mich., assignor to The
Budd Company, Philadelphia, Pa., a corporation of
Pennsylvania
Filed Dec. 19, 1966, Ser. No. 602,613
6 Claims. (Cl. 188—218)

ABSTRACT OF THE DISCLOSURE

A self-securing balance weight for use on a ventilated brake disk having a wedge shape compatible with the ventilation openings of the brake disk for a press fit and a pair of fingers for engaging the spacer ribs of the disk when the weight has been positioned.

---

This invention relates to self-securing balance weights and more particularly to balance weights for use on a ventilated brake disk having spacer ribs between two friction disk segments for creating ventilation ducts in the disk.

There are several methods of balancing brake disks presently employed by industry. Some disks are cast with excess metal that may be removed by milling or drilling to balance the finished disk. This method uses excessive material and requires an expensive operation for balancing. Another method uses balance weights that are welded or brazed to the finished disk. Such a means of balancing also has the expense of the welding operation and the danger of metal structural change due to exposure to the heat of welding.

It is an object of this invention to provide a balance weight for a ventilated brake disk that is inexpensive and easily installed and does not materially interfere with the flow of air through the ventilation ducts.

Another object of this invention is to provide a balance weight with self-contained means for inexpensively securing the weight to a ventilated brake disk.

These and other objects of this invention will become clear as reference is made to the following specification and drawings wherein:

FIG. 1 is a plan view of a ventilated brake disk with sections broken away to show a balance weight of the prior art and a pair of balance weights of the present invention, one in the secured position and one inserted between the spacer ribs prior to being secured.

FIG. 2 is a view substantially along the line 2—2 of FIG. 1 in the direction of the arrows showing the manner in which the balance weights of this invention and of the prior art are secured to the brake disk.

FIG. 3 is a perspective view of the balance weight of this invention prior to installation in a brake disk.

Referring now to the drawings, a brake disk 10 is shown having a central web section 12 with an aperture 14 centrally formed therein for positioning the disk 10 on a hub 16 for applying the disk to a wheel and/or axle (not shown). A plurality of holes 18 are radially spaced about the central aperture 14 for receiving a plurality of securing bolts 20 for securing the disk to the hub.

The twin ring segments of the disk consist of two approximately similar substantially parallel rings 22 and 24 joined by a number of generally radially extending ribs or braces 26. These ribs have fillets 28 at the points they merge into the rings 22, 24 as best seen in FIG. 2. This provides a good mechanical construction that is strong and rigid, and at the same time provides good heat conduction between the rings. The ribs also provide ventilation ducts 30 between the ring segments for the flow of cooling air therethrough. The construction thus far described is old in the art and comprises no part of this invention.

The novel balance weight 32 of this invention is best seen in FIG. 3. The balance weight 32 consists of an elongated generally V shaped channel member having a slot 34 removed from the blank at one end 40 for forming a pair of fingers 36, 38. The elongated V is tapered from the narrower slotted end 40 to the wider end 42. Such tapering is designed to accommodate the weight in a ventilation opening between the ribs 26 of the brake disk, as can be seen in FIG. 1.

Referring now to FIG. 1, at position A, the balance weight is shown as it has been inserted in the ventilation opening between the ribs 26. The balancing weight is formed as a cup shaped about an axis radiating from the center of the disc and includes edges 44 and 46 which are wider than the opening of the ribs and the height from the base of the V to the edges 44 and 46 is greater than the spacing of the disk segments for an interference fit of the balance weight in the ventilation duct. Therefore when the balance weight is pressed into the ventilation opening of the disk, the resilience of the metal due to deformation will exert a biasing action to hold the balance weight in place and eliminate rattling. The edges 44 and 46 of the balance weight generally will be pressed into the fillets 28 of the ribs 26 during the insertion of the weights to further secure the weight in the opening. The shape of the balance weight 32 also allows flow of air therethrough for adequate cooling, thus preventing "hot spots" on the disk during braking.

After the weight has been positioned in the ventilation opening, as at A, the fingers 36 and 38 are bent about the inner end of the adjacent ribs 26, as seen in FIG. 1 at B, and in FIG. 2, to further secure the balance weight in the disk and prevent removal due to centrifugal forces during rotation of the disk.

The balance weight 48 of the prior art is shown at C, in FIG. 1. The old balance weight 48 is welded to the disk by a fillet weld 50 and such securing could permit the weight to vibrate during operation of the vehicle since it is not resiliently held or biased in position.

It is preferred that the balance weight 32 be stamped and shaped from various thicknesses of sheet metal to provide different size weights for use in balancing disks.

While but one embodiment of this insertion has been illustrated and described, it is obvious that the structure may be altered or modified within the scope of the appended claims.

What is claimed is:

1. In combination with a rotatable brake disk for mounting with a vehicle wheel, said brake disk having a pair of substantially parallel ring segments, a plurality of radially extending ribs interconnecting said ring segments and defining tapered ventilation ducts between said ring segments, means for balancing said disk including a balance weight for being attached to said disk, said balancing weight being adapted for insertion with an interference fit into one of said ventilation ducts, said balancing weight being cup shaped about an axis radiating from the center of the disk and said balance weight having self-contained securing means for securing said balance weight on said disk, said securing means of said balance weight including at least one edge for being pressed into said disk during insertion of said balance weight into said ventilation duct for placing said balance weight under stress for biasing said balance weight in position within said ventilation duct, and at least one finger extending radially beyond the edge of said adjacent ribs when said balance weight is positioned in said duct for being bent about the edge of an adjacent rib for securing said balance weight from movement in one direction.

2. The apparatus as claimed in claim 1 wherein said balance weight consists of an elongated generally V shaped body having a slot at the point of the V at one end thereof, a pair of fingers adjacent said slot, said balance weight being tapered from a narrow end having said slot to a wider end more remote from said slot whereby said balance weight approximates the shape of the ventilation ducts.

3. The apparatus as claimed in claim 2 wherein said tapered balance weight is adapted for being press fit into one of said ventilation ducts with one of said fingers adjacent each rib defining one of the sides of the duct, each of said fingers being bent about its adjacent rib for securing said balance weight within said ventilation duct from movement in one direction.

4. The apparatus as claimed in claim 2 wherein said tapered balance weight is adapted for being press fit into one of said ventilation ducts with one of said fingers adjacent each rib defining one of the sides of the duct, each of said fingers being bent about its adjacent rib for securing said balance weight within said ventilation duct from movement in one direction and the tapered shape of said duct preventing movement in the other direction.

5. The apparatus as claimed in claim 1 wherein said securing means of said balance weight includes a pair of edges positioned for wedgingly engaging the opposed ribs defining said ventilation duct for placing said balance weight under compressive stress by insertion into said duct and utilizing the resilience of the balance weight for biasing said edges into said ribs for securing said balance weight within said ventilaton duct.

6. The apparatus as claimed in claim 5 wherein said balance weight consists of an elongated tapered generally V shaped body having a slot at the point of the V at the narrower end, a pair of fingers being formed by the sides of the V adjacent said slot, said fingers extending beyond said ventilation duct when said balance weight is positioned therein, each of said fingers being bent about the inner end of the respective adjacent rib for further securing of said balance weight within said ventilation duct.

References Cited
UNITED STATES PATENTS

| | | | |
|---|---|---|---|
| 2,177,861 | 10/1939 | Burger | 301—5 |
| 2,370,361 | 2/1945 | Le Jeune | 301—5 |
| 2,433,762 | 12/1947 | Kalajian | 74—573 |
| 3,273,419 | 9/1966 | Kollmann et al. | 74—573 |
| 3,292,746 | 12/1966 | Robinette | 188—218 |

MILTON BUCHLER, *Primary Examiner.*

G. E. HALVOSA, *Assistant Examiner.*